US009817387B2

(12) United States Patent
Benko et al.

(10) Patent No.: US 9,817,387 B2
(45) Date of Patent: Nov. 14, 2017

(54) SYSTEM AND METHOD FOR SELECTING A TOOL ASSEMBLY

(71) Applicant: Kennametal Inc., Latrobe, PA (US)

(72) Inventors: Mitchell D. Benko, Rootstown, OH (US); Colin John Deem, Worcestershire (GB); Pradeep Hemmanur, Bangalore (IN); Fred Patterson, Greensburg, PA (US); Karen Gallentine, Latrobe, PA (US)

(73) Assignee: KENNAMETAL INC, Latrobe, PA (US)

( * ) Notice: Subject to any disclaimer, the term of this patent is extended or adjusted under 35 U.S.C. 154(b) by 490 days.

(21) Appl. No.: 13/965,593

(22) Filed: Aug. 13, 2013

(65) Prior Publication Data
US 2015/0019001 A1  Jan. 15, 2015

(30) Foreign Application Priority Data

Jul. 8, 2013  (IN) .......................... 3043/CHE/2013

(51) Int. Cl.
*G05B 19/409*  (2006.01)
(52) U.S. Cl.
CPC .. *G05B 19/409* (2013.01); *G05B 2219/50158* (2013.01)
(58) Field of Classification Search
CPC .... G05B 19/40938; G05B 2219/36357; G05B 19/182
USPC ....................................................... 700/179
See application file for complete search history.

(56) References Cited

U.S. PATENT DOCUMENTS

| 3,147,574 | A | * | 9/1964 | La Pointe | ............. | B23Q 15/02 |
| | | | | | | 324/243 |
| 4,739,488 | A | | 4/1988 | Asakura | | |
| 6,438,445 | B1 | * | 8/2002 | Yoshida | ........... | G05B 19/40932 |
| | | | | | | 700/173 |
| 7,035,709 | B2 | * | 4/2006 | Yamada | ........... | G05B 19/40938 |
| | | | | | | 483/15 |
| 7,121,770 | B1 | * | 10/2006 | Gamble | ................ | B23C 5/109 |
| | | | | | | 407/30 |
| 7,933,677 | B2 | * | 4/2011 | Lankalapalli | ........ | G05B 19/409 |
| | | | | | | 700/172 |

(Continued)

OTHER PUBLICATIONS

Nov. 12, 2015 Office action (3 months).

(Continued)

*Primary Examiner* — Robert Fennema
*Assistant Examiner* — Jigneshkumar Patel
(74) *Attorney, Agent, or Firm* — Ian K. Samways

(57) ABSTRACT

A method of identifying a multi-component cutting tool assembly to a user includes the steps of: receiving an indication from the user of a desired characteristic of at least one of the cutting tool assembly or of a workpiece to be machined, determining at least a portion of a first set of characteristics associated with a first component of the plurality of tool components corresponds to the desired characteristic, determining at least a portion of a second set of characteristics associated with a second component of the plurality of tool components corresponds to a portion of the first set of characteristics and responsive thereto grouping the first component and the second component together to form a combination and identifying the combination to the user as the cutting tool assembly.

19 Claims, 4 Drawing Sheets

(56) References Cited

U.S. PATENT DOCUMENTS

| | | |
|---|---|---|
| 2002/0082953 A1 | 6/2002 | Batham |
| 2004/0143362 A1 | 7/2004 | Matthews |
| 2007/0038329 A1 | 2/2007 | Khurana |
| 2008/0065258 A1* | 3/2008 | Baumgartner ... G05B 19/40938 700/179 |
| 2011/0187727 A1* | 8/2011 | Ahn .................... G06F 3/04883 345/473 |

OTHER PUBLICATIONS

Sep. 9, 2015 First office action DE 10 2014 109 541 A.
I.D. Carpenter et al., A flexible tool selection decision support system for milling operations.
Ali Oral et al., Automated cutting tool selection and cutting tool sequence optimization for rotational parts.
May 2, 2016 Final Office Action U.S. Appl. No. 13/965,646.
Oct. 20, 2016 Office action (3 months).

* cited by examiner

SYSTEM AND METHOD FOR SELECTING A TOOL ASSEMBLY

FIELD OF THE INVENTION

The present invention relates to a system and method for identifying and selecting multiple components to form a metal cutting tool assembly useful for a particular metalworking operation. More particularly, the present invention relates to a system and method for identifying and selecting multiple components to form a cutting tool assembly based on the compatibility of the components forming the desired cutting tool assembly and, optionally the machining operation to be performed by the cutting tool assembly.

BACKGROUND INFORMATION

There are a variety of metal working cutting tools for cutting or shaping a metal work piece. For example, one cutting tool is a rotating cutting tool that is generally employed in shaping or cutting a metallic work piece material. Such rotating cutting tools are commonly employed in machining geometries ranging from generally planar surfaces to complex grooves, recesses, holes or curved surfaces. These rotating cutting tools include those where the tool body and the cutting edge are formed from a single solid body (typically carbide type hard material), or those where an indexable insert formed with one or more cutting edges is secured to the tool body with a bolt or wedge mechanism and the like, such that it may be freely fitted and removed.

FIGS. 1 and 2 show assembled and exploded views (respectively) of a cutting tool assembly 10 formed from a plurality of components. More particularly, cutting tool assembly includes three inserts 12 which are each coupled to a screw-on mill body 14, which is threadedly coupled to a screw-on extension 16, which is received in a collet 18, which is received and secured in a collet chuck 20, which is adapted to be coupled to a spindle (not shown) of a machine tool of a type well known in the art. It will be appreciated that the quantity and variety of components available for selection and assembly to form a cutting tool for a particular machining operation can be rather large.

It will be appreciated that in order to determine an appropriate cutting tool assembly for a particular machining operation, it is necessary for a user, such as a manufacturing engineer or the like, to understand the relationships between the tool holder, one or more cutting tools, and potentially one or more intermediary components. In addition, the user must have an understanding of the properties of the particular material or materials being machined as well as the particular geometry or geometries being machined in such material. With the large number of available cutting tools, cutting tool components and systems, machined geometries and varying cutting conditions, it is extremely difficult for a user to configure the optimum cutting tool assembly configuration for a particular machining operation.

In the past, a user was required to search through and examine multiple catalogs supplied by various cutting tool manufacturers, or to search cutting tool databases, and to select a combination of cutting tool components therefrom with little or no information about the optimum operating parameters of each particular component. Such approach requires a considerable amount of time and labor and is particularly dependent on the experience and skill of the user and therefore may be unreliable and may only take into consideration a limited number of factors which may affect machining of the workpiece and efficiency of the machining operation. Furthermore, even when the tool body is of the same series, changes in its specifications also may change the cutting conditions due to the combination.

Thus, it would be desirable to provide a selection system and method that enables a user to select a cutting tool arrangement tailored to the user's specific equipment and particular machining operation that provides fast, accurate results independent of the skill level of the user.

SUMMARY

As one aspect of the present invention a method of identifying a cutting tool assembly to a user is provided. The cutting tool assembly includes at least two tool components selected from among a plurality of tool components. The method comprises: receiving an indication from the user of a desired characteristic of at least one of the cutting tool assembly or of a workpiece to be machined; determining at least a portion of a first set of characteristics associated with a first component of the plurality of tool components corresponds to the desired characteristic; determining at least a portion of a second set of characteristics associated with a second component of the plurality of tool components corresponds to a portion of the first set of characteristics; grouping the first component and the second component together to form a combination in response to said determining at least a portion of the second set of characteristics corresponds to a portion of the first set of characteristics; and identifying the combination to the user as the cutting tool assembly.

The method may further comprise: determining at least a portion of a third set of characteristics associated with a third component of the plurality of tool components corresponds to a portion of one of the first or second sets of characteristics; and grouping the third component together with the first component and the second component as a portion of the combination in response to said determining at least a portion of the third set of characteristics corresponds to a portion of one of the first or second sets of characteristics.

Receiving an indication from the user of a desired characteristic of at least one of the cutting tool assembly or of a workpiece to be machined may comprise receiving an indication of a dimension of the cutting tool.

Receiving an indication from the user of a desired characteristic of at least one of the cutting tool assembly or of a workpiece to be machined may comprise receiving an indication of a material property of the workpiece.

Receiving an indication from the user of a desired characteristic of at least one of the cutting tool assembly or of a workpiece to be machined may comprise receiving an indication of a geometry to be machined in the workpiece.

One of the first component or the second component may comprise a cutting insert and the associated set of characteristics may comprise an indication of at least one of a material the insert is structured to machine, a dimension of the insert, a shape of the insert or a quantity of cutting edges included on the insert.

One of the first component or the second component may comprise a tool body and the associated set of characteristics may comprise an indication of at least one of a pocket shape or a dimension of the tool body.

The first component may comprise a cutting insert; the second component may comprises a cartridge; the third component may comprise a tool body; the second set of characteristics may comprise an indication of at least one of a pocket shape or a cartridge shape; and the third set of characteristics may comprise an indication of at least one of a pocket shape or a dimension of the tool body.

Identifying the combination to the user may comprise providing a listing of the first component and the second component to the user.

Identifying the combination as the cutting tool assembly to the user may comprise providing a scale model of the combination of the first component and the second component to the user.

Receiving an indication from the user of a desired characteristic of at least one of the cutting tool assembly or of a workpiece to be machined may further comprise receiving an indication of a second desired characteristic and the method may further comprise determining at least one of at least a portion of the first set of characteristics or at least a portion of the second set of characteristics corresponds to the second desired characteristic prior to identifying the combination to the user as the cutting tool assembly.

As another aspect of the present invention, a system for employing the above method is provided. The system comprises a processing device adapted to: receive the indication of the desired characteristic from the user via an input device; determine that at least a portion of the first set of characteristics associated with the first component of the plurality of tool components corresponds to the desired characteristic; determine that at least a portion of the second set of characteristics associated with a second component of the plurality of tool components corresponds to a portion of the first set of characteristics; group the first component and the second component together to form the combination in response to said determining at least a portion of the second set of characteristics corresponds to a portion of the first set of characteristics; and identify the combination to the user as the cutting tool assembly via an output device in communication with the processor.

The processor may be further adapted to determine at least a portion of a third set of characteristics associated with a third component of the plurality of tool components corresponds to a portion of one of the first or second sets of characteristics and group the third component together with the first component and the second component as a portion of the combination in response to determining at least a portion of the third set of characteristics corresponds to a portion of one of the first or second sets of characteristics.

As yet another aspect of the present invention, another system for employing the above method is provided. The system comprises: an input device; a processing device in communication with the input device; and an output device in communication with the processing device. The processing device is adapted to: receive the indication of the desired characteristic from the user via the input device; determine that at least a portion of the first set of characteristics associated with the first component of the plurality of tool components corresponds to the desired characteristic; determine that at least a portion of the second set of characteristics associated with a second component of the plurality of tool components corresponds to a portion of the first set of characteristics; group the first component and the second component together to form the combination in response to said determining at least a portion of the second set of characteristics corresponds to a portion of the first set of characteristics; and identify the combination to the user as the cutting tool assembly via the output device.

The input and output devices may comprise a single touchscreen device.

As yet a further aspect of the present invention, a method of selecting a cutting tool assembly having at least one desired characteristic, the cutting tool assembly including at least two tool components selected from among a plurality of tool components, is provided. The method comprises: determining at least a portion of a first set of characteristics associated with a first component of the plurality of tool components corresponds to the at least one desired characteristic; determining at least a portion of a second set of characteristics associated with a second component of the plurality of tool components corresponds to a portion of the first set of characteristics; grouping the first component and the second component together to form a combination in response to determining at least a portion of the second set of characteristics corresponds to a portion of the first set of characteristics; and selecting the combination as the cutting tool assembly in response to the grouping step.

The method may further comprise: determining at least a portion of a third set of characteristics associated with a third component of the plurality of tool components corresponds to a portion of one of the first or second sets of characteristics and grouping the third component together with the first component and the second component as a portion of the combination in response to determining at least a portion of the third set of characteristics corresponds to a portion of one of the first or second sets of characteristics.

The at least one desired characteristic may comprise at least a second characteristic and determining that the desired characteristic corresponds to at least a portion of at least one of the first set of characteristics or the second set of characteristics may further comprise determining that the desired second characteristic also corresponds to at least a portion of at least one of the first set of characteristics or the second set of characteristics.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

While various embodiments of the invention are illustrated, the particular embodiments shown should not be construed to limit the claims wherein like numerals are used for like elements throughout. It is anticipated that various changes and modifications may be made without departing from the scope of the invention.

DETAILED DESCRIPTION OF THE INVENTION

As used herein, the term "user" shall be used to refer to a person or persons who desire to identify and configure one or both of a cutting tool assembly having particular characteristics or for use in a machining operation having particular characteristics from individual components.

A method 30 of selecting a cutting tool assembly in accordance with an example embodiment of the present invention is shown in FIG. 3 and FIGS. 4-6. It will be appreciated that the figures show a particular type modular rotating milling cutter cutting tool assembly. The present invention is equally applicable to the configuration of any type cutting tool assembly comprised of individual components.

In general, the method provides for the selection of a cutting tool assembly by a user, the cutting tool assembly being formed from at least two components, each selected from among a plurality of compatible tool components (e.g., without limitation, from a product line or in-stock inventory). Methods in accordance with the present invention offer a number of advantages over known methods such as previously described in the background section. Such advantages include, among others, that the time and expertise required in selecting one or more of the components of the cutting tool assembly is greatly reduced in comparison to previously known solutions. Embodiments of the present invention may be utilized by a user who is looking for a particular type of cutting tool assembly for a given operation or alternatively by a user that knows the end product they intend to machine but are looking for guidance in regard to selecting the cutting tool assembly needed to machine the desired finished product.

Figure 4:
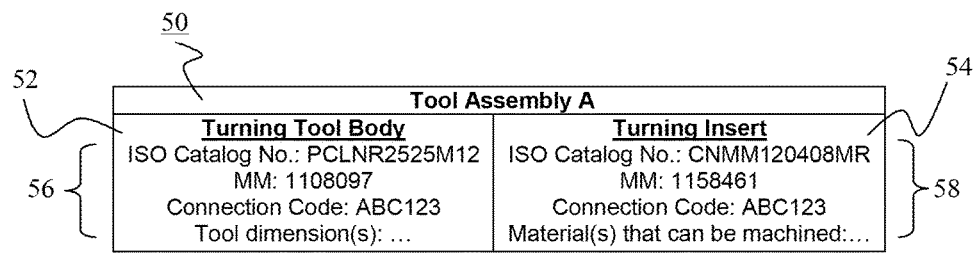
FIGS. 4-6 are schematic diagrams of example cutting tool assemblies formed from multiple tool components in accordance with embodiments of the present invention.

It is to be appreciated that the methods described herein are generally applicable to being carried out through the use of a computing mechanism, such as, for example, without limitation, a desktop or laptop computer, a handheld computing device (e.g., tablet computer, smartphone) or any other suitable electronic processing device. In example embodiments of the invention such devices may be used to selectively access databases stored online (e.g., in an internet based "cloud" storage) or may rely on locally stored data. The data can be stored in data base format in any suitable electronic media, such as a memory storage device, microprocessor, controller, PLC, RAM, ROM, ASIC, CDROM, DVD, and the like. The attributes or characteristics of the individual components of the tool assemblies 50, 60 and 70 are shown in FIGS. 4-6 that may be included in a database associated with each of the cutting tool components listed.

Figure 5:
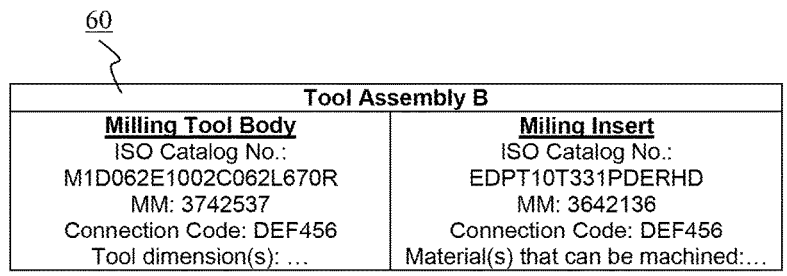
Figure 6:
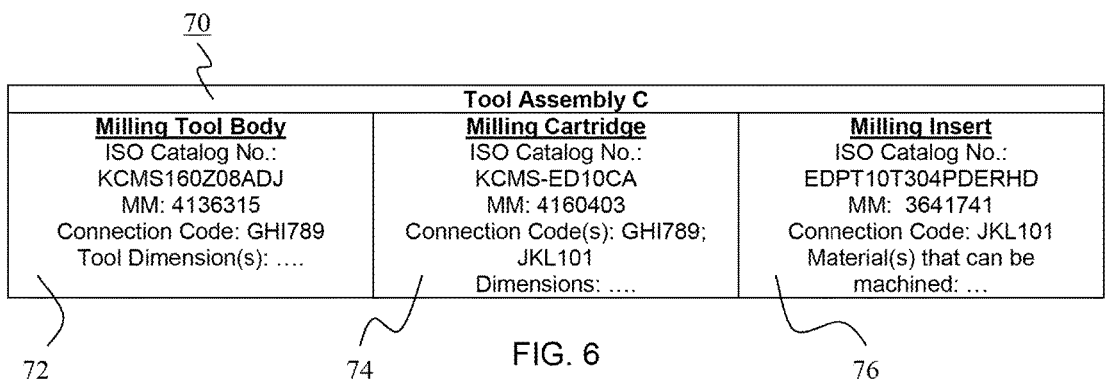

For example, the tool assembly 50 of FIG. 5, "Tool Assembly A", was formed by the combination of tool components 52 and 54, "Turning Tool Body" and Turning Insert". Each of components 52 and 54 have a number of attributes or characteristics 56, 58 associated therewith in the database. Such characteristics associated with each tool component may include, for example, without limitation, a catalog number (e.g., ISO Catalog No.), a unique internal reference number (e.g., MM: #) and a reference code which indicates compatible components (e.g. Connection Code: . . . ). For components adapted to contact a workpiece during machining (e.g., without limitation, inserts, or cutting edge of a solid end mill or drill and the like), such characteristics 58 may include details of a suitable material or materials to be machined (e.g., type of material, hardness of material, etc.) as well as further details of the cutting features of such component (e.g., without limitation, number of cutting edges, corner radius, cutting tool material composition). For those components that do not contact a workpiece (e.g., without limitation, tool bodies, tool holders, extensions, such characteristics 56 may further include dimensional information (e.g., without limitation, diameter, reach, number of pockets, rigidity). Such characteristics are provided in the database such that each component may be searched based upon the particular (sometimes unique) characteristics associated therewith.

Figure 3:
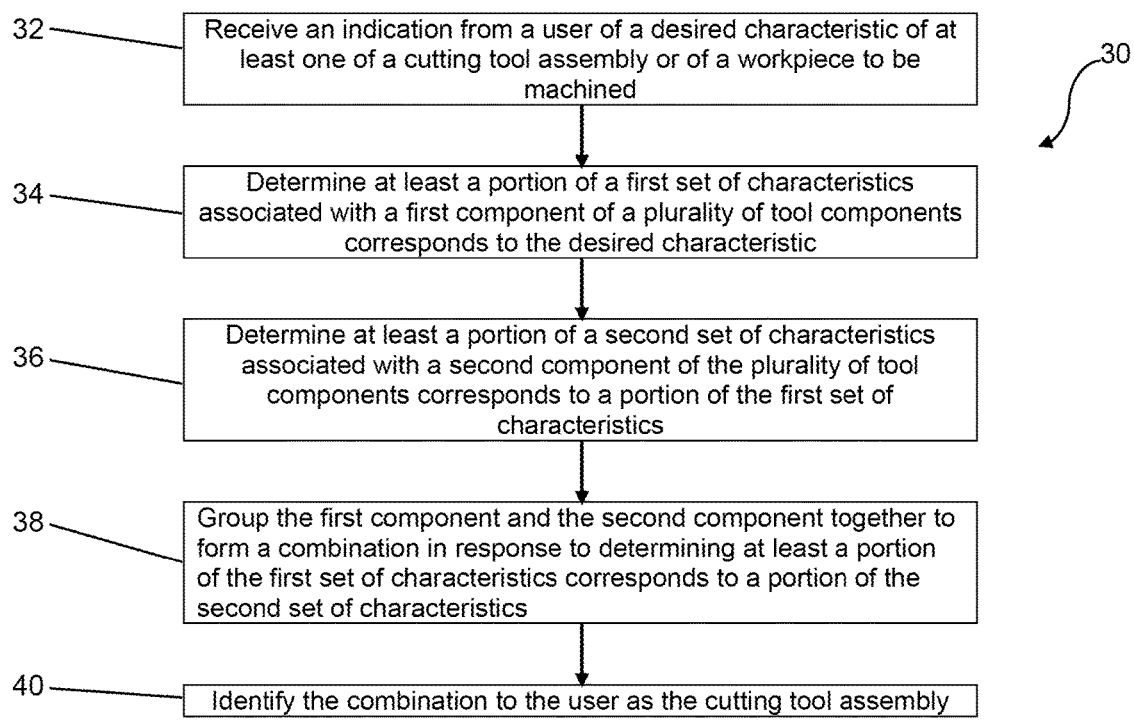
FIG. 3 is a flow chart showing an example method in accordance with an embodiment of the present invention.

Referring to FIG. 3, the method 30 begins at step 32 where an indication from a user of a desired characteristic is selected of at least one of a cutting tool assembly or of a workpiece to be machined is received. As briefly discussed above, such characteristics of a cutting tool assembly may include, for example, without limitation: dimensions of the cutting tool (e.g., without limitation, cutting diameter, depth of cut, corner radius), number of flutes, length of flutes, number of inserts, and grade of insert. Characteristics of a workpiece may include, for example, without limitation, the type of material to be machined (e.g., without limitation, AISI 4140) or hardness of material.

In another embodiment of the invention, the characteristic is indicated by the user inputting the desired characteristic into a field or fields of an input screen or selecting a desired characteristic from a drop down menu. It is to be appreciated, however, that any other suitable input arrangement may be employed without varying from the scope of the present invention.

Next, as shown in step 34, it is determined that at least a portion of a first set of characteristics associated with a first component of the plurality of tool components corresponds to the desired characteristic. In other words, a particular component or components having the desired characteristic associated therewith are identified in the database of components.

After such component or components are identified, a second component or components which are compatible (i.e., correspond, compatible with) the first component or components are then determined (i.e., identified) based on at least a portion of the characteristics associated with the second component or components (e.g., the "Connection Code"), as shown in step 36

Figure 1:
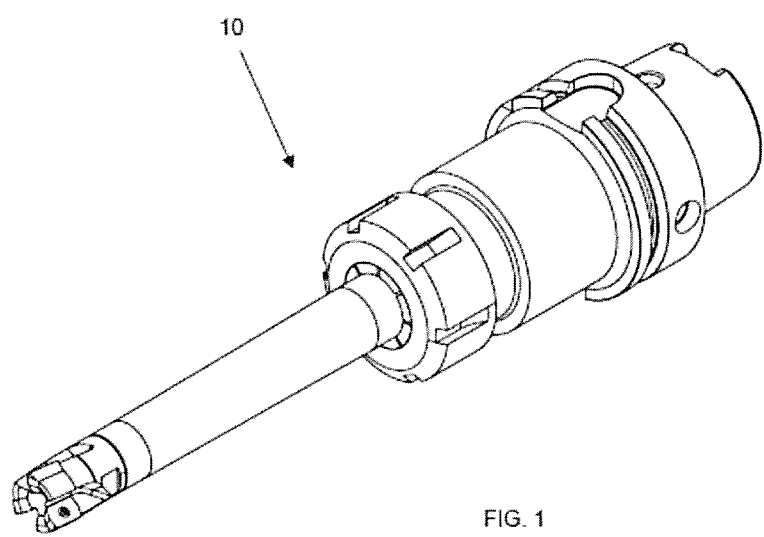
FIG. 1 is an isometric view of an example cutting tool assembly formed from a plurality of separate components.
Figure 2:
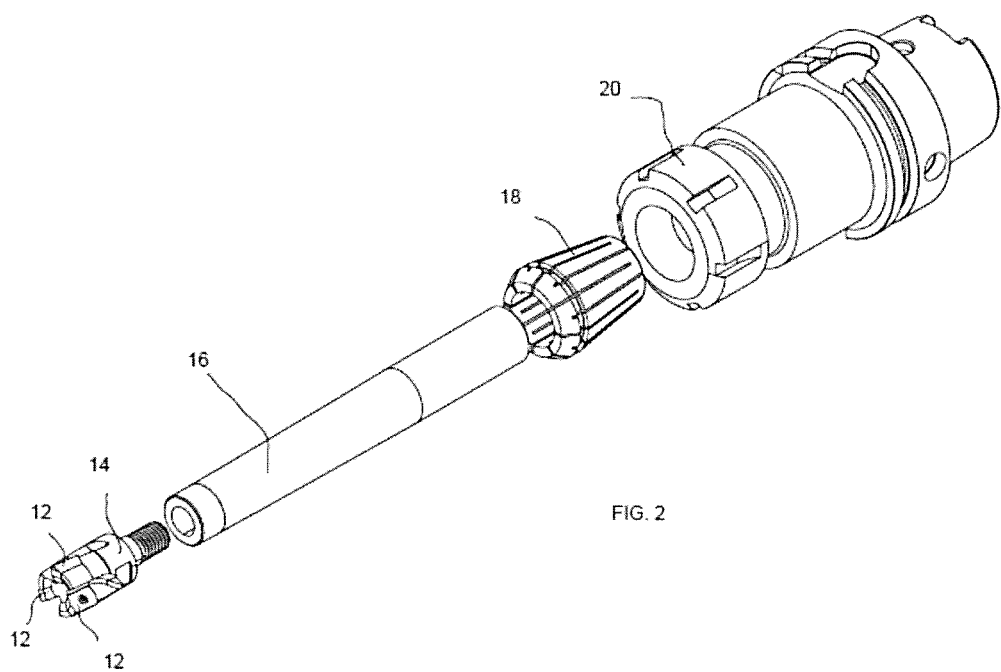
FIG. 2 is an exploded isometric view of the cutting tool assembly of FIG. 1 showing the individual components which form the cutting tool assembly.

Next, as shown in step 38, the first and second components are then associated or grouped together as a combination in response to the determination made in step 36. If characteristics of either of the first or second components indicate that there are other corresponding components (i.e., the complete cutting tool assembly has more than two parts, such as the assembly 70 shown in FIG. 6) the method may further include additional steps similar to steps 36 and 38 in which corresponding third, fourth, fifth (see the example cutting tool assembly FIGS. 1 and 2), or more components are grouped together to form a combination.

In the example cutting tool assembly 50 shown in FIG. 3, only two components (i.e., a holder body 52 and an insert 54) fit together to form the assembly 50. The example cutting tool assembly 60 of FIG. 5 shows a similar arrangement as that of FIG. 4 while the example cutting tool assembly 70 of FIG. 6 includes three components (i.e., a tool body 72, a milling cartridge 74 which fits in the tool body 72, and a milling insert 76 which fits in the milling cartridge 74).

Once a combination is completed, the combination of components is identified to the user as the cutting tool assembly, as shown in step 40. The combination of components may be identified to the user as a listing of the components and optionally particular details thereof (e.g., without limitation, part numbers, pricing information, availability, etc.) to assist the user in obtaining such components. Such listing may be provided on an output device (e.g., a display screen), via a hard copy paper printout or via any other suitable delivery method known in the art. In various embodiments of the present invention, the identification of the cutting tool assembly includes one or both of scale representations of each of the components of the cutting tool assembly and/or a scale representation of the assembled cutting tool assembly. Such representations may be provided as a visual for the user to confirm the components and/or assembly appear(s) as intended and/or as an electronic model which may be subsequently used by the user in programming the machine tool for which the cutting tool assembly is intended to be used.

It will be appreciated that the methods of the invention are not limited by the number of components which together form a cutting tool assembly and that the invention can be practiced with any desired number of components based upon the operating conditions of the cutting tool assembly. It will also be appreciated that, dependent on the number of potential components included in the database, the number of potential matching components or assemblies identified may be more than one. In such case, all of the assemblies located may be provided to the user as a listing. Such listing may be ordered in accordance with a preset ranking system based upon ready availability in inventory, metal removal rate or by a ranking selected by the user, e.g., cost.

In order to limit the number of potential matching components identified by the method, the method generally shown in FIG. 3 may further include receiving one or more additional desired characteristics of at least one of a cutting tool assembly or of a workpiece to be machined from the user. Such additional characteristics may then be used to identify combinations formed from components where applicable components have corresponding characteristics. For example, if a cutting tool assembly was initially grouped according to a desired workpiece material (and thus assembled based on cutting components suitable for machining such material), a further desired characteristic of a particular desired cutting diameter would reduce the amount of potential assemblies to only those in which the components (e.g., a holder) included such a diameter as a characteristic.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

We claim:

1. A method of identifying a cutting tool assembly to a user, the cutting tool assembly including at least two tool components selected from among a plurality of tool components, the method comprising:
   receiving an indication from the user of a desired characteristic of at least one of the cutting tool assembly or of a workpiece to be machined;
   determining that at least a portion of a first set of characteristics associated with a first component of the plurality of tool components corresponds to the desired characteristic;
   determining that at least a portion of a second set of characteristics associated with a second component of the plurality of tool components corresponds to another portion of the first set of characteristics;
   grouping the first component and the second component together to form a combination in response to said determining that at least a portion of the second set of characteristics corresponds to another portion of the first set of characteristics; and
   identifying the combination to the user as the cutting tool assembly,
   wherein the portion of the second set of characteristics and the other portion of the first set of characteristics comprise a reference code associated, respectively, with each of the second component of the plurality of tool components and the first component of the plurality of tool components, the reference code including a plurality of alphanumeric characters,
   wherein matching reference codes indicate compatible components, wherein said determining that at least a portion of the second set of characteristics corresponds to another portion of the first set of characteristics comprises determining matching reference codes between the second component of the plurality of tool components and the first component of the plurality of tool components.

2. The method of claim 1, further comprising:
determining that at least a portion of a third set of characteristics associated with a third component of the plurality of tool components corresponds to a portion of one of the first or second sets of characteristics; and
grouping the third component together with the first component and the second component as a portion of the combination in response to said determining that at least a portion of the third set of characteristics corresponds to a portion of one of the first or second sets of characteristics.

3. The method of claim 1 wherein receiving an indication from the user of a desired characteristic of at least one of the cutting tool assembly or of a workpiece to be machined comprises receiving an indication of a dimension of the cutting tool assembly.

4. The method of claim 1 wherein receiving an indication from the user of a desired characteristic of at least one of the cutting tool assembly or of a workpiece to be machined comprises receiving an indication of a material property of the workpiece.

5. The method of claim 1 wherein receiving an indication from the user of a desired characteristic of at least one of the cutting tool assembly or of a workpiece to be machined comprises receiving an indication of a geometry to be machined in the workpiece.

6. The method of claim 1 wherein one of the first component or the second component comprises a cutting insert and wherein the associated set of characteristics comprises an indication of at least one of: a material the insert is structured to machine, a dimension of the insert, a shape of the insert or a quantity of cutting edges included on the insert.

7. The method of claim 1 wherein one of the first component or the second component comprises a tool body and wherein the associated set of characteristics comprises an indication of at least one of a pocket shape or a dimension of the tool body.

8. The method of claim 2 wherein:
the first component comprises a cutting insert;
the second component comprises a cartridge;
the third component comprises a tool body;
the second set of characteristics comprises an indication of at least one of a pocket shape or a cartridge shape; and
the third set of characteristics comprises an indication of at least one of a pocket shape or a dimension of the tool body.

9. The method of claim 1 wherein identifying the combination to the user comprises providing a listing of the first component and the second component to the user.

10. The method of claim 1 wherein identifying the combination as the cutting tool assembly to the user comprises providing a scale model of the combination of the first component and the second component to the user.

11. The method of claim 1 wherein:
receiving an indication from the user of a desired characteristic of at least one of the cutting tool assembly or of a workpiece to be machined further comprises receiving an indication of a second desired characteristic; and
wherein the method further comprises determining that at least one of at least a portion of the first set of characteristics or at least a portion of the second set of characteristics corresponds to the second desired characteristic prior to identifying the combination to the user as the cutting tool assembly.

12. A system for employing the method as recited in claim 1, the system comprising:
a processing device adapted to:
receive the indication of the desired characteristic from the user via an input device;
determine that at least a portion of the first set of characteristics associated with the first component of the plurality of tool components corresponds to the desired characteristic;
determine that at least a portion of the second set of characteristics associated with a second component of the plurality of tool components corresponds to another portion of the first set of characteristics;
group the first component and the second component together to form the combination in response to said determining that at least a portion of the second set of characteristics corresponds to another portion of the first set of characteristics; and
identify the combination to the user as the cutting tool assembly via an output device in communication with the processor.

13. The system of claim 12 wherein the processor is further adapted to:
determine that at least a portion of a third set of characteristics associated with a third component of the plurality of tool components corresponds to a portion of one of the first or second sets of characteristics; and
group the third component together with the first component and the second component as a portion of the combination in response to determining that at least a portion of the third set of characteristics corresponds to a portion of one of the first or second sets of characteristics.

14. A system for employing the method as recited in claim 1, the system comprising:
an input device;
a processing device in communication with the input device; and
an output device in communication with the processing device,
wherein the processing device is adapted to:
receive the indication of the desired characteristic from the user via the input device;
determine that at least a portion of the first set of characteristics associated with the first component of the plurality of tool components corresponds to the desired characteristic;
determine that at least a portion of the second set of characteristics associated with a second component of the plurality of tool components corresponds to another portion of the first set of characteristics;
group the first component and the second component together to form the combination in response to said determining that at least a portion of the second set of characteristics corresponds to another portion of the first set of characteristics; and
identify the combination to the user as the cutting tool assembly via the output device.

15. The system of claim 14 wherein the input and output devices comprise a single touchscreen device.

16. A method of selecting a cutting tool assembly having at least one desired characteristic, the cutting tool assembly including at least two tool components selected from among a plurality of tool components, the method comprising:
 determining that at least a portion of a first set of characteristics associated with a first component of the plurality of tool components corresponds to the at least one desired characteristic;
 determining that at least a portion of a second set of characteristics associated with a second component of the plurality of tool components corresponds to another portion of the first set of characteristics;
 grouping the first component and the second component together to form a combination in response to said determining that at least a portion of the second set of characteristics corresponds to another portion of the first set of characteristics; and
 selecting the combination as the cutting tool assembly in response to said grouping;
 wherein the portion of the second set of characteristics and the other portion of the first set of characteristics comprise a reference code associated, respectively, with each of the second component of the plurality of tool components and the first component of the plurality of tool components, the reference code including a plurality of alphanumeric characters,
 wherein matching reference codes indicate compatible components,
 wherein said determining that at least a portion of the second set of characteristics corresponds to another portion of the first set of characteristics comprises determining matching reference codes between the second component of the plurality of tool components and the first component of the plurality of tool components.

17. The method of claim 16 further comprising:
 determining that at least a portion of a third set of characteristics associated with a third component of the plurality of tool components corresponds to a portion of one of the first or second sets of characteristics; and
 grouping the third component together with the first component and the second component as a portion of the combination in response to said determining that at least a portion of the third set of characteristics corresponds to a portion of one of the first or second sets of characteristics.

18. The method of claim 16 wherein the at least one desired characteristic comprises at least a second characteristic and wherein determining that the desired characteristic corresponds to at least a portion of at least one of the first set of characteristics or the second set of characteristics further comprises determining that the desired second characteristic also corresponds to at least a portion of at least one of the first set of characteristics or the second set of characteristics.

19. The method of claim 16 wherein the at least one desired characteristic comprises a dimension of the cutting tool assembly.

* * * * *